US006816534B2

(12) United States Patent
Flint et al.

(10) Patent No.: US 6,816,534 B2
(45) Date of Patent: Nov. 9, 2004

(54) TUNABLE SINGLE FREQUENCY FILTER FOR LASERS

(75) Inventors: Graham W. Flint, Albuquerque, NM (US); Maurice A. Pessot, San Diego, CA (US); Eric B. Takeuchi, San Diego, CA (US)

(73) Assignee: General Atomics, San Diego, CA (US)

( * ) Notice: Subject to any disclaimer, the term of this patent is extended or adjusted under 35 U.S.C. 154(b) by 0 days.

(21) Appl. No.: 10/138,091

(22) Filed: May 3, 2002

(65) Prior Publication Data

US 2003/0016706 A1 Jan. 23, 2003

Related U.S. Application Data

(60) Provisional application No. 60/288,333, filed on May 3, 2001, and provisional application No. 60/355,412, filed on Feb. 5, 2002.

(51) Int. Cl.[7] .............................................. H01S 3/08
(52) U.S. Cl. ......................... 372/105; 372/92; 372/20
(58) Field of Search ........................... 372/105, 92, 20, 372/22

(56) References Cited

U.S. PATENT DOCUMENTS

| | | | | |
|---|---|---|---|---|
| 5,001,716 A | * | 3/1991 | Johnson et al. ................ | 372/10 |
| 5,031,182 A | * | 7/1991 | Anthon et al. | |
| 5,218,610 A | | 6/1993 | Dixon | |
| 5,263,038 A | * | 11/1993 | Lukas et al. ................... | 372/22 |
| 5,337,056 A | | 8/1994 | Dax | |
| 5,371,587 A | | 12/1994 | de Groot et al. | |
| 5,715,044 A | | 2/1998 | Hayes | |
| 5,956,355 A | | 9/1999 | Swanson et al. | |
| 6,160,826 A | | 12/2000 | Swanson et al. | |
| 6,330,523 B1 | | 12/2001 | Kacyra et al. | |
| 6,373,872 B2 | | 4/2002 | Deacon | |

OTHER PUBLICATIONS

M. Okada, et al., "Electronic Tuning of Dye Lasers by an Electrooptic Birefringent Fabry–Perot Etalon," Optics Communications, vol. 14, No. 1, North–Holland Publishing Co., Amsterdam, May 1975, pp. 4–7.*

Fukashiro, et al., "Fast and fine wavelength tuning of a GCSR laser using a digitally controlled driver", OFC/IOOC 2000 Technical Digest, WN43, Baltimore, MD, Mar. 2000.

Mason, et al., "Ridge Waveguard Sampled Granting DBR Lasers with 22–nm Quasi–Continuous Tuning Range", IEEE Phot. Tech. Lett., vol. 10, No. 9, Sept. 1998.

Product Info., "Erbium Fiber Laser", MPB Technologies, Model EFL R98–TS, Feb. 1997.

Rigole, et al., "Quasi–continuous tuning range from 1560 to 1520 nm in a GCSR laser, with high power and low tuning currents.", Electron. Lett., vol. 32, No. 25, 1996.

White, et al., "Experimental Demonstration of a Novel Media Access Protocol for HORNET: A Packet–over–WDM Multiple–Acess MAN Ring.", IEEE Phot. Tech. Lett., vol. 12, No. 9, Sept. 2000.

* cited by examiner

*Primary Examiner*—Tuyet Vo
*Assistant Examiner*—Leith A Al-Nazer
(74) *Attorney, Agent, or Firm*—Law Offices of James D. McFarland (57) ABSTRACT

A single frequency filter for a laser, comprising a polarizer that defines a direction of polarization and one or more birefringent elements situated within the cavity with their dielectric axes offset from the direction of polarization. The ends of the birefringent elements have a finite reflectance, and may be coated for reflectance or left uncoated. In some embodiments the filter is situated in a laser cavity with a broadband gain medium, in other embodiments, the filter is situated in an external cavity. To provide tunability, a wavelength control system is coupled to the birefringent element. An embodiment is described in which the filter comprises two birefringent elements of unequal optical length along the optical axis, which advantageously reduces the voltage required to tune the frequency. To provide tunability, the first and second birefringent elements are both coupled to a wavelength control system that simultaneously controls both elements.

37 Claims, 4 Drawing Sheets

TUNABLE SINGLE FREQUENCY FILTER FOR LASERS

CROSS-REFERENCE TO RELATED APPLICATION

Priority is hereby claimed to U.S. Provisional Application No. 60/288,333, filed May 3, 2001, entitled SINGLE FREQUENCY LASER FOR TELECOMMUNICATIONS, and U S. Provisional Application No. 60/355,412, filed Feb. 5, 2002, entitled BIREFRINGENT FILTER FOR MODULATING A LASER IN PHASE AND AMPLITUDE, which are incorporated by reference herein.

BACKGROUND OF THE INVENTION

1. Field of the Invention

This invention relates to lasers, and particularly to single frequency lasers such as those used for telecommunication purposes.

2. Description of Related Art

A single frequency, tunable laser with a narrow linewidth is useful for many applications. For example advanced sensors for defense applications require stable, highly single frequency lasers with as narrow a linewidth as possible. On the commercial front, optical networks can benefit from the added functionality that a tunable source can provide, and therefore the laser technologies required to support those networks continue to be a major area of focus of developers.

In order to provide single frequency operation, a variety of techniques have been used. One technique is to insert a Fabry-Perot etalon (FPE) into a laser cavity that is thin enough to restrict operation to a single mode within the gain-bandwidth of the laser material. However, this technique cannot be used effectively with broadband gain media due to the thinness that would be required to limit operation to a single frequency. Furthermore, the longitudinal modes (wavelengths) allowed by the etalon are set by its geometry, and therefore a laser with a conventional etalon is not tunable in any significant way.

It has been suggested to use birefringent materials in an intracavity filter configuration in order to reduce the number of longitudinal modes and to provide single frequency operation. In such conventional birefringent filters, a birefringent crystal is arranged within the laser cavity at Brewster's angle, oriented such that the polarization is at 45° between two differing dielectric axes. Problems with such conventional birefringent filters include lack of discrimination between adjacent modes; in other words, the peaks are not sharp enough to provide single frequency operation. In an attempt to improve discrimination, multiple birefringent filters (e.g. 2, 3, or more) may be used together to obtain single frequency operation; unfortunately this approach increases cost and complexity, and reduces reliability.

It may be noted that these two types of filters—the etalon and the birefringent filter—have different uses. The FPE is generally used with a narrowband gain medium in an attempt to restrict oscillation to a single (or at most a few) frequencies, whereas the birefringent filter is generally used with a broadband gain medium to restrict oscillation to a narrower portion of the gain spectrum. For conventional single frequency lasers, a FPE is not constructed of a birefringent material, as this would not result in single frequency operation except under unusual circumstances.

Although both an etalon and a birefringent filter may be used simultaneously in a laser cavity in an attempt to restrict the oscillation of a broadband gain medium to a single frequency, that approach is unlikely to be effective by itself. Particularly, such an arrangement is highly unlikely to operate effectively over a significant tuning range since it requires that, at some point within the gain bandwidth, both the FPE and the birefringent filter have some preferred frequency in common; i.e. there is a requirement of synchronism between the preferred frequency of the FPE and birefringent filter. The existence of this synchronism is a fortuitous occurrence, although it can be controlled to some extent by independent control of some of the filter parameters, such as the angle of incidence or temperature of the FPE. Unfortunately, this arrangement is highly sensitive to any disturbance or other variation in the local environment. Furthermore, such an arrangement is extremely difficult to tune over any significant range.

Although single frequency lasers can be useful in a wide variety of wavelengths and applications, when developing photonic systems for communications, it becomes advantageous to consider the 1.5 micron wavelength regime as the band of choice. Use of this band allows system designers to leverage developments in the optical communications arena, usually leading to wider availability and lower product costs. This allows the use of low-loss optical fiber, filters, optical amplifiers, and so forth; all of which have been developed for the commercial marketplace. However, despite explosive growth in the number of optical products, there remains a significant shortfall relative to laser transmitters that meet the technical requirements for advanced military and commercial applications.

Many high performance applications involving 1.5 micron laser sources call for narrow linewidth and single-frequency output. In this context, system designers wishing to use conventional technologies are often forced to utilize the available semiconductor-based sources at 1.5 microns. Unfortunately, performance limitations of such semiconductor-based sources often require substantial design-arounds to meet system design goals. Semiconductor laser manufacturers achieve single-frequency, narrow linewidth operation by incorporating either distributed feedback (DFB) or distributed Bragg reflector (DBR) configurations into their basic semiconductor laser design. In this way, the DFB and DBR sections of the device enforce single frequency behavior, also leading to line narrowing. Although there have been great strides in improving the performance of these structures, typical DFB linewidths are still large (e.g. in the 1-10 MHz regime), prohibiting their use in applications that require very narrow linewidth emission. Additionally, by their very nature, DFB and DBR lasers are fixed-wavelength devices, and, as a consequence, are unsuitable for applications requiring rapid tunability.

One method currently utilized for producing a tunable output in the 1.5 $\mu$m regime involves the use of conventional semiconductor-based lasers that have been incorporated into an external grating configuration. In such lasers, the external grating enforces single-frequency, narrow-linewidth performance of an otherwise multi-mode, broad-spectrum semiconductor laser. Tuning is achieved by mechanically tilting the grating. Although this method has been successfully implemented in commercial devices, the tuning rate is slow (on the order of seconds); a limitation which prevents their use in applications that require rapid tuning.

Another method being investigated to produce a tunable output employs a semiconductor-based vertical cavity surface emitting laser (VCSEL) gain region that is integrated with a micro-electro-mechanical (generically referred to as a MEMS device) mirror to provide one of the mirrors in the resonator. By moving the MEMS mirror along the VCSEL axis, the wavelength of the output can be tuned. However, this process also has relatively slow tuning (tens of microseconds). Furthermore, such devices have not been successfully brought to market.

To improve upon existing DFB and DBR laser capabilities by incorporating tunability, it has been suggested to incorporate additional sections into the DFB and/or DBR structures, such as disclosed in B. Mason, et al., IEEE Phot. Tech. Left., Vol. 10, No. 9, Sept. 1998 and in P. -J. Rigole, et al., Electron. Left., Vol. 32, No. 25, 1996. These devices integrate multiple frequency-selective sections into a common semiconductor laser structure. By varying the injection current into each of the independent sections, their frequency selective properties are slightly modified so as to produce wavelength tuning. Because of the relatively low amount of injection current required to tune across the desired wavelength range (typically on the order of 10 mA), the tuning speed can, theoretically, approach the tens-of-nanoseconds regime. In every case, however, the linewidths are wide which is typical of semiconductor DFB and DBR sources (on the order of one megahertz) with relatively low (<10 mW) output power. In summary, although the DFB and DBR technologies appear to be progressing toward the development of fast switching devices, no products have been developed that are fast and have a narrow linewidth sufficient for present day system requirements.

Lasers based on erbium-doped fibers that emit directly in the 1.5 μm regime present another alternative to achieving tunable output. Typically, these fiber lasers are pumped by single-mode diodes emitting in the 980 nm regime. The pump radiation is coupled into the core of the erbium-doped fiber by way of conventional fiber-coupling techniques. End mirrors that form the fiber laser resonator can be formed by either dielectric coatings or, more efficiently, fiber Bragg gratings (FBG's) that are tuned to the wavelength of choice. Tunability is achieved by modifying the spectral reflectance of the FBG output coupler. By changing the effective periodicity of the FBG (typically by thermal or mechanical means), the output can be tuned across a frequency range that is consistent with the degree of change in the periodicity of the FBG. Although lasers of this type, as disclosed in Product info, MPB Technologies, Model EFL R98-TS, have produced narrow linewidth (10 kHz typical) and moderate output power (20 mW), the tuning rate is extremely slow (e.g. several seconds or more).

SUMMARY OF THE INVENTION

A laser is described in which a gain material having a broad emission spectrum includes a filter situated within the laser cavity that forces the laser to oscillate at a single frequency (i.e. a single longitudinal mode). Single longitudinal mode operation is useful for a wide variety of applications such as fiber optic telecommunications (both analog and digital), fiber optic-based RF transmission, and spectroscopic applications.

In one embodiment, a single wavelength laser is described that comprises a laser cavity including a first end mirror and a second end mirror, a broadband gain medium situated within the cavity, and a pump source for pumping the gain medium. The single frequency filter comprises a polarizer situated within the laser cavity, the polarizer defining a direction of polarization, and a birefringent element situated within the cavity. The birefringent element has a configuration including opposing partially reflective surfaces such as in an etalon configuration, and comprises a birefringent material arranged with two of its differing dielectric axes offset about 45° from the direction of polarization.

To provide tunability, a wavelength control system is coupled to the birefringent element that may comprise a temperature control system including a thermoelectric cooler thermally coupled to the birefringent element and/or an electro-optic driver electrically coupled to the birefringent element.

In some embodiments the polarizer comprises a Brewster plate or a polarization-selective material. The birefringent element has a finite reflectance so that it can act as an etalon, and may be substantially uncoated, or may comprise a reflective coating.

An embodiment is described in which the intracavity filter comprises two birefringent elements of unequal optical length along the optical axis ("a dual-BR filter"), which advantageously reduces the voltage required to tune the frequency, thereby providing a wide tuning range within practical constraints. The first and second birefringent elements are arranged proximate to each other. Each includes parallel, smooth opposing surfaces normal to the optical axis, and each comprises a birefringent material. The first birefringent element is arranged with two of its differing dielectric axes oppositely aligned with the dielectric axes of the second birefringent element. Typically, the first and second birefringent elements comprise substantially identical materials. To provide tunability, the first and second birefringent elements are coupled to a wavelength control system, such as an electro-optic system.

In some embodiments, the single frequency filter can be implemented into a DPSS laser that includes a solid state gain medium optically pumped by a laser diode, an architecture that has many benefits. Typical characteristics of DPSS lasers include high output power, a near-diffraction-limited output from a circular beam, small physical size, frequency stability and the use of conventional diode pump sources. In addition, the individual optical components that comprise the basic DPSS laser typically are fabricated from materials that lend themselves to mass production techniques, such as "slice and dice" of the bulk materials and the application of dielectric coatings; both of which benefit greatly from mass-production scalability.

In one embodiment that uses a dual-BR filter as described herein, a single DPSS laser source can be tuned rapidly across a spectral range in the 1.5 μm regime, which is consistent with conventional fiber-optic components, while providing a narrow linewidth output. This range can cover the 40 nm band typically referred to in optical communications as the erbium C-band (1.53-1.57 μm). Moreover, in some embodiments random wavelength addressability can be achieved across this entire band in the tens-of-nanoseconds time frame. This enabling technology promises a dramatic increase in laser system design flexibility for both military and commercial applications.

Embodiments are described in which the filter comprises an external cavity that is arranged to select a single wavelength from a multi-wavelength laser beam applied to it. In such embodiments, the tunable filter for selecting a wavelength from an optical beam comprises an optical cavity, a polarizer situated within the optical cavity, the polarizer defining a direction of polarization, and one or more birefringent elements situated within the optical cavity. In an embodiment that includes a single birefringent element, the birefringent element has a configuration including opposing partially reflective surfaces such as in an etalon configuration, and the birefringent element comprises a birefringent material arranged with its dielectric axes offset about 45° from the direction of polarization. A wavelength control system is coupled to the birefringent element. In some embodiments, the tunable filter comprises two birefringent elements.

BRIEF DESCRIPTION OF THE DRAWINGS

For a more complete understanding of this invention, reference is now made to the following detailed description of the embodiments as illustrated in the accompanying drawing, wherein.

DETAILED DESCRIPTION

This invention is described in the following description with reference to the figures, in which like numbers represent the same or similar elements.

Glossary of Terms and Acronyms

The following terms and acronyms are used throughout the detailed description:

| | |
|---|---|
| AR | anti-reflection, e.g. AR coating |
| axial length | length along the optical axis |
| BR-FPE filter | a first type of single frequency filter described herein |
| DBR laser | distributed Bragg reflector laser (a type of semiconductor laser) |
| DFB laser | distributed feedback laser (a type of semiconductor laser) |
| DPSS laser | Diode-pumped solid state laser |
| dual-BR filter | a second type of single frequency filter described herein |
| Er | erbium |
| Er, Yb: glass | a broadband solid state gain medium that has a gain-bandwidth of about 40 nm, centered at about 1550 nm |
| etalon | an optical element that has highly smooth, parallel opposing surfaces |
| FPE | Fabry-Perot etalon |
| LN | lithium niobate (a birefringent material) |
| n | index of refraction |
| Yb | ytterbium |
| $YVO_4$ | yttrium orthovanadate (a birefringent material) |

Overview

A laser is described herein in which a gain material having a broad emission spectrum (i.e., has a large spectral region over which oscillation is possible) includes a filter situated within the laser cavity that forces the laser to oscillate at a single frequency (i.e. a single longitudinal mode). Single longitudinal mode operation is useful for a wide variety of applications such as fiber optic telecommunications (both analog and digital), fiber optic-based RF transmission, and spectroscopic applications. Two basic embodiments of a single frequency filter are described herein.

In a first filter embodiment, termed a BR-FPE filter, the single frequency filter includes a birefringent element that has been formed into an etalon, and a polarizer whose axis of preferred polarization is about 45° between the axes of the birefringent material. This embodiment can be tuned by temperature applied to the birefringent element and/or, if the birefringent element is electro-optic, then it can also be tuned by an electrical signal.

In a second filter embodiment, termed a dual-BR filter, the single frequency filter includes two birefringent elements whose extraordinary and ordinary axes are oppositely aligned (i.e. the extraordinary axis of one is aligned with the ordinary axis of the other), and a polarizer whose axis of preferred polarization is at about 45° between the axes of the birefringent material.

In some implementations, the single frequency filter is situated within the cavity of a 1.5 micron diode-pumped solid-state (DPSS) laser. DPSS lasers emitting in the 1.5 micron regime offer many intrinsic advantages over conventional 1.5 micron lasers; for example, typical characteristics of DPSS lasers include high power, low noise (amplitude and phase), and narrow spectral linewidth (e.g. less than 10 kHz). Moreover, DPSS lasers typically use conventional broad-stripe semiconductor lasers as pump sources; these require fewer fabrication steps; thereby allowing them to be integrated into systems at lower cost than typical DFB/DBR lasers. DPSS lasers also are amenable to drop-in modularity. In general, the DPSS laser technology offers much flexibility in the basic laser design, providing a platform to design a DPSS laser to which the single frequency filter can be added to provide the rapid tunability and single frequency performance required for many high performance applications.

There exist numerous new and emerging commercial applications that would greatly benefit from the realization of a highly single frequency, tunable laser source. In future DWDM-based optical networks, for example, it is possible that rapidly tunable lasers could replace the multiplicity of single wavelength lasers (corresponding to individual channels in the DWDM grid), used to transmit information.

The fast-tuning lasers described herein could be useful in traffic management and wavelength packet switching; neither of which features are easily achieved with currently available technologies. As an example, White, et al., IEEE Phot. Tech. Lett., Vol. 12, No. 9, Sept. 2000, has investigated the use of fast-tunable lasers in a new optical network scheme. This network testbed, referred to as "Hybrid Optoelectronic Ring Network" (HORNET), uses a packet-over-WDM multiple-access ring architecture; this being optimized for bursty, unpredictable traffic patterns. Instead of maintaining fixed point-to-point connections, the ring nodes are equipped with additional logic that allows them to sense traffic patterns on each wavelength, and to tune the laser such that traffic at each wavelength is most efficiently utilized. Although additional steps were required to make the network successful (due to the response of the tunable lasers used in the experiment) as disclosed in Y. Fukashiro, et al, OFC/IOOC 2000 Technical Digest, WN43, Baltimore, Md., March 2000, the testbed nevertheless demonstrated the applicability of these advanced intelligent networks.

Laser Including a BR-FPE Filter to Provide Single Frequency Operation

Figure 1:
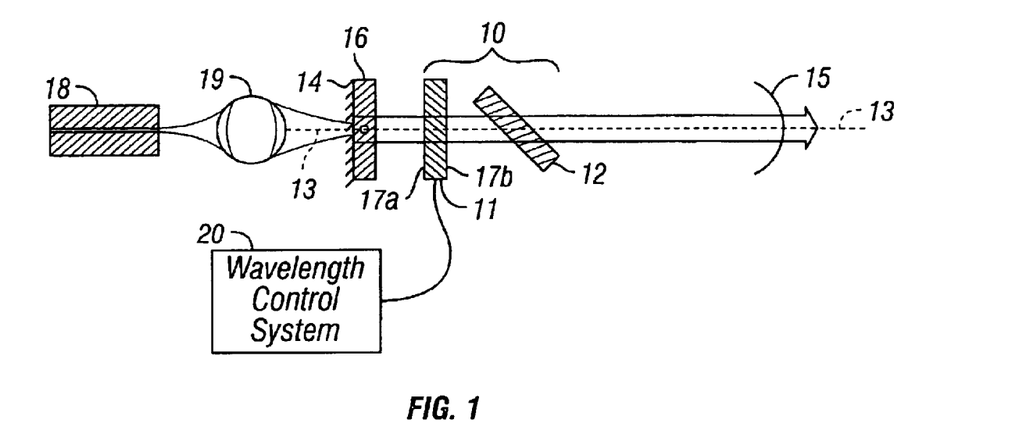
FIG. 1 is a schematic diagram of a single frequency laser that includes a BR-FPE filter.

FIG. 1 is a schematic diagram of one embodiment of a single frequency laser that includes a BR-FPE filter 10 that includes a birefringent element 11 and a polarization-selective element 12. As will be described, the birefringent element 11 is formed into the configuration of a Fabry-Perot etalon (FPE), which has extremely smooth, parallel opposing surfaces including a first surface 17a and a second surface 17b. These etalon surfaces are coated with a reflective coating, or may be left uncoated to provide a finite reflectivity at the laser emission. Unlike conventional birefringent filters, the surfaces are not coated for anti-reflection at the laser wavelength. The thickness of the birefringent filter is selected depending upon design considerations such as the width of the passband desired. It may be advantageous to match the width of the passband to approximately coincide with the gain-bandwidth curve of a broadband laser medium. For example, to provide a passband of about 40 nm centered at about 1550 nm to match the gain-bandwidth curve of Er,Yb:glass, an etalon of LN would have a thickness of about 400 microns.

The laser in FIG. 1 also comprises a laser resonator that defines a laser axis 13 with two end mirrors including a first end mirror 14 and a second end mirror 15, one of which is partially transmissive to provide an output coupling. In the embodiment shown in FIG. 1, the second end mirror 15 is curved, and is partially transmissive (e.g. about 1% transmission) at the laser wavelength, and therefore the laser output exits from the second mirror 15.

Within the resonator is a broadband gain medium 16, such as a solid state laser material that is pumped by a suitable optical source such as a laser diode 18, The pump radiation from the laser diode 18 is coupled to the gain medium by any suitable optical system. In the embodiment shown in FIG. 1, the laser diode radiation is focused from the laser diode 18 into the gain medium 16 by a ball lens 19.

In one embodiment, the broadband gain medium 16 comprises glass co-doped with ytterbium ($Yb^{3+}$) and erbium ($Er^{3+}$) referenced as Er,Yb:glass. The left hand surface of the gain medium is coated to allow for transmission of the pump radiation and reflection of the laser radiation, thus this left hand surface forms one of the resonator mirrors. The right hand surface of the gain medium is anti-reflection coated at the laser wavelength. In alternative embodiments, either the first or second end mirror, or both, may be a separate element.

The birefringent filter 10, situated within the laser cavity, includes the birefringent element 11 and the polarization-selective element ("polarizer") 12, which in one embodiment comprises a Brewster plate, which may comprise an optical material such as glass oriented at Brewster's angle. In other embodiments the polarizer may have another structure comprising a polarization-selective material such as POLARCOR, which is available from Corning, Inc. of Corning, N.Y. Such a polarization-selective material may be arranged with its surfaces normal to the laser axis. The polarizer's function is to select a fixed polarization. The birefringent element 11 and the polarizer 12 operate in conjunction with the gain medium 16 to select a single frequency. Furthermore, the birefringent element is fabricated with surfaces 17a and 17b sufficiently parallel to form an etalon (e.g. <10 arc-sec), and is either uncoated, or coated on both surfaces to provide a finite reflectivity R. The etalon structure of the birefringent element is thick enough to provide a sufficiently small free spectral range to provide single frequency operation, as described elsewhere herein.

A wavelength control system, shown in block at 20, is coupled to the birefringent element in order to control its properties and thereby change the wavelength. The wavelength control system 20 includes any suitable drivers, electronics, sensors, and other devices that may be required or useful to control the wavelength. For example it may comprise the temperature control system shown in FIG. 9 and discussed with reference thereto. Alternately, the wavelength control system 20 could include electrical drivers and control circuitry to apply a voltage to electrically change the wavelength using electro-optic effects. Some embodiments of the wavelength control system 20 could include both temperature and electrical control systems.

Figure 2:
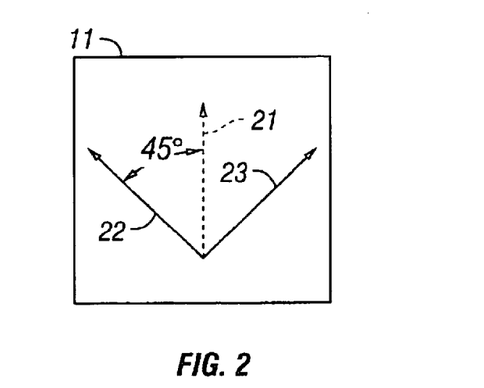
FIG. 2 is a diagram that shows the orientation of the axes of the birefringent element with respect to the preferred polarization axis defined by the polarizer.

FIG. 2 is a cross-sectional view of the birefringent element, illustrating the relationship between a preferred polarization 21 and the dielectric axes of the birefringent material. The preferred polarization 21 is determined by the polarizer 12 (FIG. 1). The birefringent element 11 defines three dielectric axes, including an a-axis, a b-axis, and a c-axis. In some embodiments described herein, the birefringent element 11 comprises a uniaxial birefringent crystal (e.g. LN) that has two ordinary axes (the a- and b-axes) and an extraordinary axis (the c-axis). As is known, the two ordinary axes have a similar index of refraction, while the extraordinary axis has a different index of refraction. In other embodiments, another type of crystal (e.g. a biaxial crystal) or another type of birefringent material may be used to provide birefringent properties.

In one embodiment, the a-axis (e.g. one of the ordinary axes) of the birefringent element is aligned with the cavity axis 13. The b-axis (e.g. the other ordinary axis), shown at 22 and the c-axis (e.g. the extraordinary axis) shown at 23, which has a differing index from the b-axis, are at right angles to each other, and oriented such that the plane containing both of these axes is aligned substantially perpendicular with the cavity axis. However, in some embodiments, the b- and c-axes of the birefringent element do not have to be precisely perpendicular to the cavity axis. The birefringent element is configured so that the b- and c-axes 22 and 23 of the birefringent element form an approximately 45° angle with respect to the preferred polarization axis 21 as defined by the polarizer 12.

Analysis of Operation

The BR-FPE filter 10 described herein provides frequency selectivity and enforces single frequency operation by combining two functions—an etalon and a birefringent filter—into a single device. For analysis purposes, the etalon function will be discussed first.

Because the birefringent element 11 is fabricated into an etalon configuration, and each opposing surface has a significant reflectivity (i.e. it is coated for reflection or left uncoated), it functions as a Fabry-Perot etalon (FPE). It may be noted that the birefringent crystal in a conventional birefringent filter is anti-reflection coated to prevent etalon effects, and therefore would not function as an etalon.

It is well known that a Fabry-Perot etalon has transmission properties such that certain frequencies pass through the device with minimal loss, these frequencies being determined by the relation:

$$v = \frac{mc}{2nl} \quad (1)$$

where $v$ is the frequency of the radiation, m is an integer, c is the velocity of light, n is the index of refraction of the material from which the etalon is fabricated, and l is the thickness of the etalon. When the frequency of the radiation deviates from the value as defined by Eqn. (1), the loss will increase. The actual value of the loss will depend both upon how much the actual frequency deviates from one of the preferred frequencies, and upon the reflectivity, R, of each of the surfaces. Expressions for the loss can be found, for example, in Born and Wolf, *Principles of Optics* (6$^{th}$ Edition), Pergamon Press, Elmsford, N.Y. (1980), Chapter 7.

However, when the FPE is fabricated from a birefringent material and the birefringent element is oriented such that two axes of differing indices (e.g. the ordinary and extraordinary axes) are perpendicular to the laser axis, two sets of frequencies exist that satisfy relations similar to Eqn. (1), one set for the ordinary ($n_o$) and one set for the extraordinary ($n_e$) index of refraction:

$$v_0 = \frac{mc}{2n_0 l} \quad (2a)$$

$$v_e = \frac{qc}{2n_e l} \quad (2b)$$

where m and q are integers, and in general are not equal. Thus within the BR-FPE filter described herein, the FPE structure in the birefringent material functions as a filter that defines two sets of frequencies that can be supported with minimum loss, with the restriction that these frequencies also reside within the spectral bandwidth over which the gain medium can provide sufficient gain.

If we ignore for the moment the Fabry-Perot character of the birefringent element 11, we can examine how the birefringent material interacts with the polarizer 12 (e.g. Brewster plate) to provide a degree of frequency selection. The Brewster plate defines a preferred axis of polarization. When the polarized radiation enters the birefringent element, oriented with its dielectric axes at 45° with respect to the polarization, each component of the radiation (resolved into components parallel to the dielectric axes) traverses a differing optical path length when making a double-pass through the birefringent element. Thus, in general, the resulting radiation field after double-passing through the birefringent element will have an elliptical polarization, and will experience a loss upon transmission through the Brewster plate. However, certain frequencies satisfying the relationship:

$$v = \frac{sc}{2(n_e - n_0)l} \quad (3)$$

where s is an integer, will emerge from the birefringent element with a linear polarization which is aligned to the preferred polarization direction as determined by the Brewster plate. Thus the birefringent element 11, in concert with the polarizer 12, acts as a filter that defines a set of frequencies of minimum loss. This is a well-known phenomenon, and is the basis for a frequency selective element commonly known as a birefringent filter.

It may be noted that the scale on which the birefringent filter and FPE frequency-selection processes operate are quite different. For typical values (l≈0.25 mm, and n≈2), the frequencies defined by the FPE are separated by about 300 GHz; whereas the preferred frequencies allowed by the conventional birefringent filter ($n_e - n_o$≈0.1) are separated by about 6 THz. Both of these spacings are broad in comparison to the frequencies supported by the laser cavity, for which typical spacings might be anywhere from about 6–60 GHz. At a wavelength of about 1.55 μm, these frequency separations between adjacent modes are equivalent in wavelength to about 2.4 nm (FPE), 48 nm (birefringent element), 0.048–0.48 nm (cavity modes).

As discussed in the background, although both an etalon and a birefringent filter may be used simultaneously in a laser cavity in an attempt to restrict the oscillation of a broadband gain medium to a single frequency, that approach is unlikely to be effective by itself. Particularly, such an arrangement is highly unlikely to operate since it requires that, at some point within the gain bandwidth, both the FPE and the birefringent filter have some preferred frequency in common; i.e. there is a requirement of synchronism between the preferred frequency of the FPE and birefringent filter.

It has been found that, when the FPE configuration and birefringent filter are combined into a single element, synchronism always exists between a preferred frequency of the FPE and the birefringent filter, which allows tunable, single frequency operation as described herein. This can be shown using Eqns. (2a) and (2b); particularly, if we demand that the frequency $v_e$ be identical to the frequency $v_o$. we can then write:

$$2n_o l v = mc \quad (4a)$$

$$2n_e l v = qc \quad (4b)$$

By subtracting (4a) from (4b), and identifying (q−m)=s, we arrive at the condition that specifies the preferred frequencies for the birefringent filter:

$$v = \frac{sc}{2(n_e - n_0)l} \quad (5)$$

Thus the FPE structure, when constructed of a birefringent material and combined with a polarization selective element, insures that every preferred frequency of the birefringent filter is also a preferred frequency of the FPE. Furthermore, this relationship holds even when the temperature of the birefringent element is varied, which allows the operational frequency to be tuned across a wide range by, for example varying the temperature of the BR-FPE or by applying an electric field as described herein.

Examples of BR-FPE Filters

Two embodiments of the BR-FPE filter are described herein for purposes of illustration. In one embodiment, the birefringent element 11 comprises yttrium orthovanadate (YVO$_4$), which has refractive indices of 1.96 and 2.17 for $n_o$ and $n_e$ respectively, formed to a thickness of about 175 microns. In this embodiment the birefringent element is uncoated, and has a surface reflectivity of between about 10.5 and 13%, depending on the polarization. This design yields a separation between preferred frequencies of the birefringent filter of about 4.1 THz, or 33 nm. The birefringent material's length is chosen such that only a single preferred frequency of the birefringent filter can reside near the center of the erbium gain spectrum (width about 40 nm) at any time. At the same time the Fabry-Perot effect yields a separation between preferred frequencies of approximately 440 GHz, which is sufficient to provide enough discrimination against adjacent cavity modes to enable single frequency operation, when the spacing between adjacent longitudinal modes is approximately 6 GHz or greater.

In a second embodiment, the BR-FPE filter 10 comprises the birefringent material lithium niobate (LN), with a thickness of about 400 microns, which has refractive indices of 2.15 and 2.22 for $n_e$ and $n_o$ respectively. The LN element is uncoated, and has a surface reflectivity of about 13.5%. This design yields a separation between preferred frequencies of the birefringent filter of 5.4 THz, (or 43 nm), and is chosen such that only a single preferred frequency of the birefringent filter can reside within the Er gain spectrum (width about 40 nm) at any time. At the same time the Fabry-Perot effect yields a separation between preferred frequencies of about 170 GHz, and is sufficient to provide enough discrimination against adjacent cavity modes to enable single frequency operation, when the spacing between adjacent longitudinal modes is about 6 GHz or greater.

If, in a particular implementation, the combined BR-FPE filter does not provide enough mode discrimination to prevent adjacent longitudinal modes from oscillating, the discrimination can be increased by coating the surfaces of the birefringent element 11 to achieve a surface reflectivity that is greater than the uncoated surface reflectivity. Although the reflective coating will not affect the birefringent properties of the birefringent material, from the standpoint of the FPE, the coating will yield sharper peaks so that the loss increases more rapidly as one deviates from a preferred frequency, and the absolute value of the maximum loss is also increased.

In all cases, a preferred location of the BR-FPE filter within the laser cavity is somewhere where the cavity mode has a waist. For example in one design, a cavity waist exists about 2 mm to the right of the Er,Yb:glass gain element, and the BR-FPE filter is located approximately at that point.

Although two specific embodiments using $YVO_4$ and LN as the birefringent material are described herein, many other implementations are possible using other birefringent materials. For example, in other embodiments the birefringent material could comprise crystal quartz, mica, lithium borate (LBO), barium borate (BBO), potassium niobate ($KNbO_3$), or potassium titanyl phosphate (KTP). Many other possibilities exist. Some factors to consider in selecting a particular material (and determining the thickness of the material) are the material quality, the material birefringence, the temperature dependence of the indices of refraction and the thermal expansion coefficients, the spectral bandwidth of the gain medium, the longitudinal mode spacing of the laser cavity, and the loss required to suppress adjacent longitudinal modes. For embodiments that utilize the electro-optic effect, the birefringent elements must also exhibit an electro-optic response. In other embodiments, such as if only temperature tuning is implemented, an electro-optic effect would not be necessary.

Temperature Sensitivity and Tuning

Some birefringent materials are sensitive to temperature; that is, their refractive indices and/or length change in response to temperature. This characteristic can be used to temperature-tune the laser to a specific wavelength. Particularly, by varying the temperature of the birefringent element, the preferred frequency of operation can be tuned; the sensitivity of the tuning rate with temperature depending on the properties of the birefringent material. This method of temperature tuning can be applied to any of the single frequency filters described herein; for example it can be applied to the BR-FPE filter described with reference to FIG. 1 et seq., and it can also be applied to the dual-BR filter described below with reference to FIG. 5 et. seq.

Figure 9:
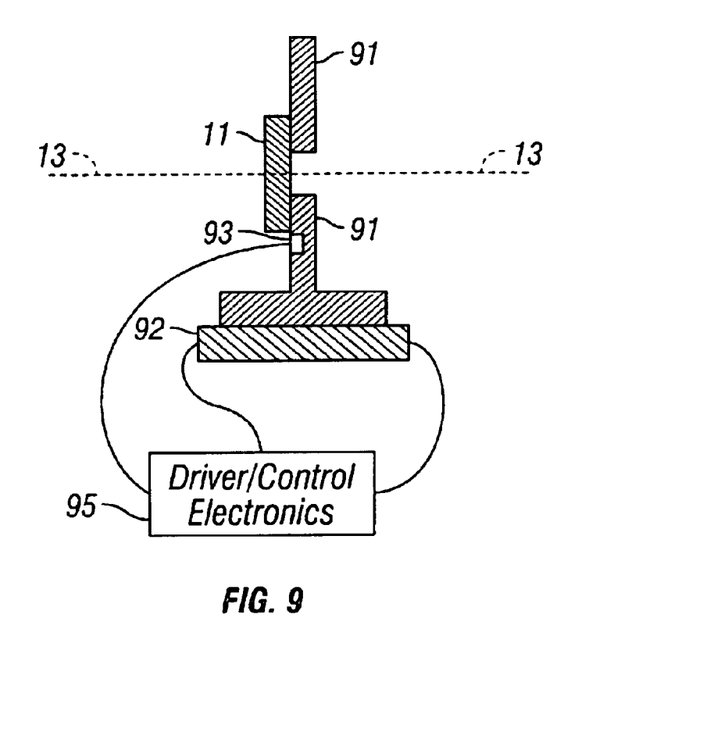
FIG. 9 is a diagram of a temperature control system in one embodiment.

FIG. 9 is a cross-sectional view of one system that can be used to temperature tune the single frequency filter. FIG. 9 shows a birefringent element 11 coupled to a heat-conductive mount 91, which may comprise a metal such as copper. The mount 91 has an aperture arranged to allow propagation of laser light along the laser axis 13. A thermo-electric cooler (TEC) 92 is thermally coupled to the base of the mount 91, and a temperature sensor 93 (such as a thermistor) is also affixed to the mount. Suitable driver/control electronics 95 are connected to the TEC and temperature sensor in order to control the TEC 92 responsive to the desired temperature, to provide the desired output wavelength.

For example, in the embodiment of the BR-FPE filter described herein using LN, the selected wavelength (which is related to the preferred frequency by $\lambda=c/\nu$) tunes at a rate of about $-0.65$ nm/° C. This tuning sensitivity is sufficiently high that it is straightforward to tune the laser over a significant fraction of the erbium gain spectrum.

However, it may be noted that for some applications (e.g. frequency offset locking of a pair of lasers to a reference RF signal) temperature sensitivity is undesirable. In such cases, an embodiment may be used in which the birefringent element comprises a material that is substantially insensitive to temperature variations, such as $YVO_4$, which has a calculated temperature tuning sensitivity of about $-0.03$ nm/° C.

Electrically Tunable BR-FPE Filter for Tunable Single Frequency Operation

Figure 3:
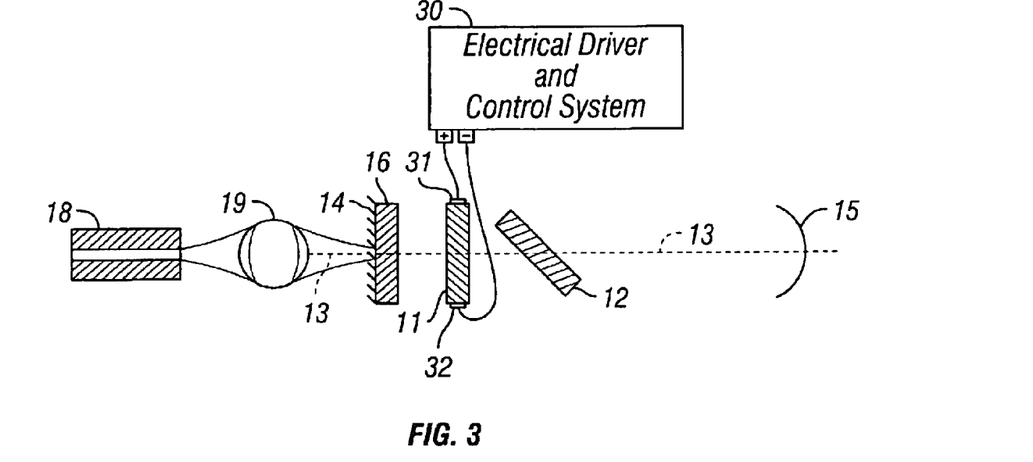
FIG. 3 is a schematic diagram of an electrically tunable single frequency laser that includes a BR-FPE filter.

FIG. 3 is a schematic diagram of an alternative embodiment of FIG. 1, in which the BR-FPE filter includes an electrical driver and control system 30 that is connected to the birefringent element 11 by a pair of electrodes 31 and 32. In some embodiments, the electrodes are aligned to apply a voltage along the extraordinary axis 23 (FIG. 2). By applying a voltage across the birefringent element, the laser output can quickly tuned over a large spectral range; particularly, electrical tuning is provided by applying an electric field to the electro optic element, instead of the much slower temperature tuning method. Fast tunability is an especially desirable feature for optical telecommunications. However, in some embodiments it may be useful to temperature control the first and second birefringent elements; for example a TEC thermally coupled to the first and second birefringent elements may be used to provide a common temperature to both the first and second birefringent elements.

In one example, the BR-FPE filter comprises a LN crystal with the following parameters:

| | |
|---|---|
| Thickness: | 0.65687 mm |
| FSR: | 25 nm |
| Wavelength Shift: | $-0.6$ nm/° C. |

If an E-field is applied along the c-axis of the LN, both the ordinary and extraordinary refractive index are modified, thus allowing electric field tuning of the laser. Using the e-o coefficients $r_{13}$ (9.6 pm/V) and $r_{33}$ (30.9 pm/V), the differential phase retardation is:

$$\Gamma = \frac{2\pi L}{\lambda}(n_e - n_0) - \frac{\pi L}{\lambda}(n_e^3 r_{33} - n_0^3 r_{13})E \quad (6)$$
$$= \frac{2\pi L}{\lambda}(\Delta n) - \frac{\pi L}{\lambda} r_{eff} E$$

where $$r_{eff} = (n_e^3 r_{33} - n_o^3 r_{13})$$

and $$\Delta n = n_e - n_o$$

Assume that the length L is chosen such that the zero field birefringence is an integer m times π. Then:

$$L = \frac{m\lambda}{2\Delta n} \quad (7)$$

is the condition that specifies the minimum loss wavelength and we can write the difference between the electric field induced birefringence and the static birefringence as:

$$\Delta\Gamma = \Gamma(E) - \Gamma_0 = -\frac{m\pi r_{\text{eff}} E}{2\Delta n} \quad (8)$$

In order to tune the pass wavelength over a full free spectral range (FSR) of the BR-FPE filter, the E-field induced birefringence must equal π. The E-field to accomplish this can be found from:

$$E_x = -\frac{\lambda}{r_{\text{eff}} L} = -\frac{2\Delta n}{r_{\text{eff}}} \frac{1}{m} \quad (9)$$

For the LN parameters given above, the order m is 62. Using $n_e=2.138$ and $n_o=2.211$, the value of $r_{\text{eff}}$ is $1.98\times10^{-10}$ m/V. For a typical 1 mm electrode separation, the required voltage to tune over the FSR (25 nm) is 11.3 kV. Due to this large voltage requirement of the thin etalon in this embodiment, electrical tuning across a full FSR is not practical in many embodiments due to driver and cost limitations. It may be noted that the wavelength will shift in direct response to the applied voltage; however, due to the distinct longitudinal modes supported by the cavity, the wavelength will jump over some intervals in increments of about one cavity-FSR. For example, in order to provide a desired wavelength output, the laser output may be monitored, and the applied voltage may be adjusted by the control system until the desired wavelength is achieved. Alternatively, a series of predetermined voltages may be respectively associated with particular wavelengths.

Figure 4:
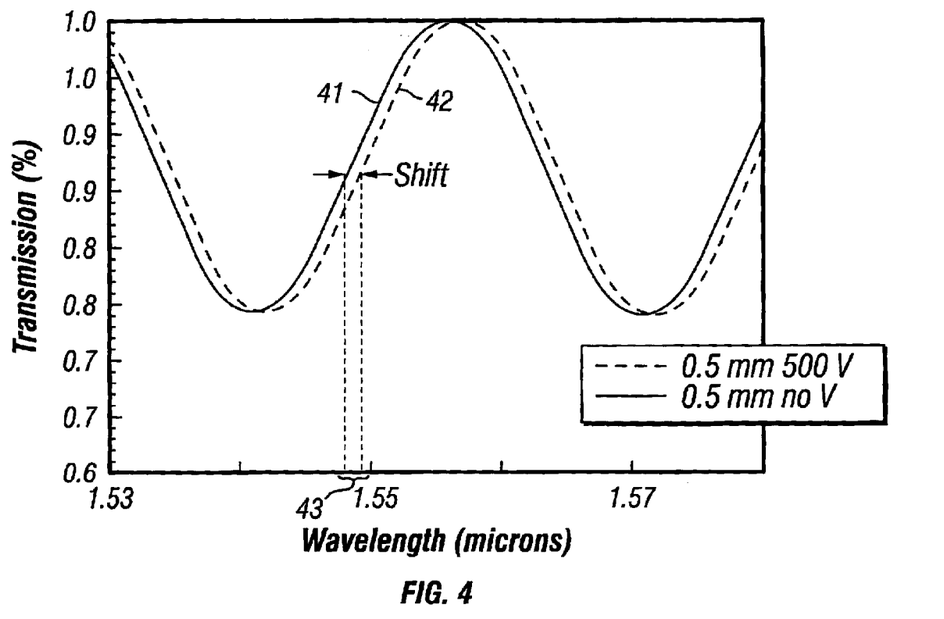
FIG. 4 is a graph that shows the shift in transmission vs. wavelength responsive to a 500V signal in one embodiment of the laser that includes a BR-FPE filter as in FIG. 3.

FIG. 4 is a graph that shows the shift in transmission vs. wavelength caused by a 500V signal in one embodiment of the laser of FIG. 3. In this embodiment the birefringent element 11 comprises lithium niobate with a 0.5 mm thickness along the optical axis. Particularly, a solid line 41 shows the calculated transmission for zero applied voltage (0.0V), and a dotted line 42 shows the calculated transmission in response to 500V applied to the birefringent element. In this example, the wavelength shift, shown at 43, is about 0.8 nm for 500V, which is about $1.75\times10^{-3}$ nm/V.

Dual-Crystal Birefringent (Dual-BR) Filter: Temperature Compensated Electric Field Tuning One problem with electrically tuning the single-crystal BR-FPE filter 10 relates to the large electric field that must be applied to the birefringent element 11 to shift the center frequency. This requirement effectively renders electrical tuning impractical for many potential applications of the BR-FPE filter described above. For example, in one embodiment to provide a BR-FPE filter bandwidth that approximately coincides with the gain-bandwidth curve of a broadband solid state gain medium, the birefringent element must be very thin (e.g. less than about 500 microns). In such an embodiment, a higher voltage is required to shift the wavelength than if the etalon were wider. In comparison, the dual crystal birefringent filter (dual-BR filter) configuration described herein with reference to FIG. 5 et. seq. substantially reduces the voltage required to shift the wavelength, making it much more practical and enabling a much wider range of applications.

Figure 5:
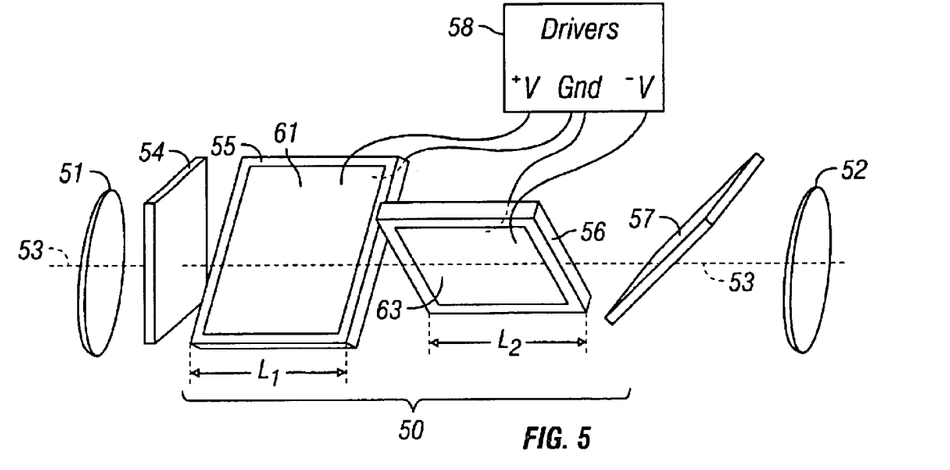
FIG. 5 is a schematic diagram of a laser that includes a dual-BR filter situated within the laser cavity.

FIG. 5 is a schematic diagram of a laser that includes a dual-BR filter 50 situated within the laser cavity. The laser cavity is defined by two end mirrors including a first end mirror 51 and a second end mirror 52 that define an optical axis 53. A suitable gain medium 54, such as a solid state gain material (e.g. Er,Yb:glass) is situated within the cavity. Any suitable optical pumping system may be used to pump the gain medium 54, such as the laser diode and ball lens shown in FIG. 1.

The dual-BR filter 50 includes a first birefringent element 55, a second birefringent element 56 proximate thereto, and polarization-selective element ("polarizer") 57, which in one embodiment comprises a Brewster plate. The polarizer's function is to select a preferred polarization for the first and second birefringent elements. Suitable electro optic drivers 58 are connected to the first and second birefringent elements to electrically modulate the indices of refractions, such as described herein.

The opposing surfaces of each birefringent element (i.e. the surfaces normal to the laser axis) are highly parallel and highly smooth. These opposing surfaces may be coated for reflectivity, left uncoated, or AR-coated. In one embodiment the two outer surfaces (i.e. the surface of the first birefringent element proximate to the gain medium and the surface of the second birefringent element proximate to the polarizer) are partially reflective, and their corresponding inner surfaces are AR-coated.

The first birefringent element 55 has an axial length $L_1$ (e.g. about 5 mm) defined along the optical axis between its opposing surfaces, and the second birefringent element 56 has an axial length $L_2$ (e.g. about 5.5 mm) defined along the optical axis between its opposing surfaces. As will be discussed, the two axial lengths $L_1$ and $L_2$ are unequal, and the amount of the difference between the two axial lengths (ΔL), which may be small (e.g. 0.5 mm difference), is related to the response of the filter.

The birefringent elements comprise any suitable material that exhibits birefringence, such as LN, $YVO_4$, crystal quartz, mica, lithium borate (LBO), barium borate (BBO), potassium niobate ($KNbO_3$), or potassium titanyl phosphate (KTP). Some factors to consider in selecting a particular material (and determining the thicknesses of the two elements) are the material quality, birefringence, the temperature dependence of the indices of refraction and the thermal expansion coefficients, the spectral bandwidth of the gain medium, the longitudinal mode spacing of the laser cavity, and the loss required to suppress adjacent longitudinal modes. For embodiments that utilize the electro-optic effect such as shown in FIG. 5, the birefringent elements must also exhibit an electro-optic response. In other embodiments, such as if only temperature tuning is implemented, an electro-optic effect would not be necessary.

Figures 6, 7:
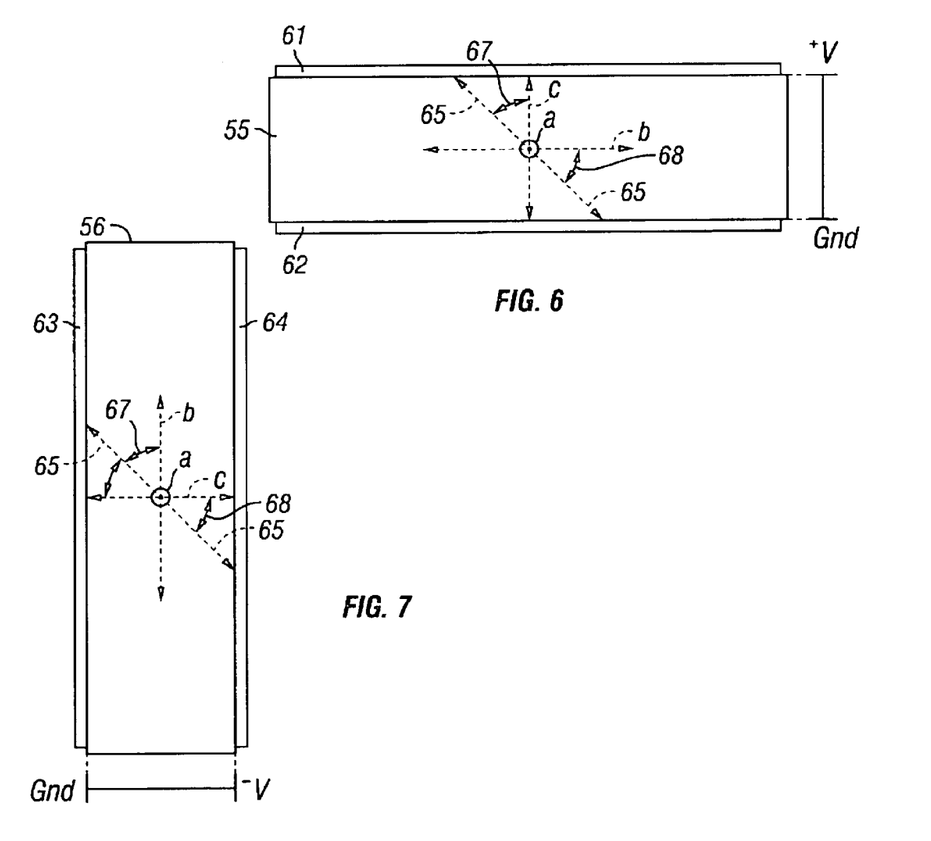
FIG. 6 is a cross-sectional view of the first birefringent element taken perpendicular to the optical axis in FIG. 5, showing the crystal orientation and the applied voltage for one embodiment.
FIG. 7 is a cross-sectional view of the second birefringent element taken perpendicular to the optical axis in FIG. 5, showing the crystal orientation and the applied voltage for one embodiment.

Reference is now made to FIGS. 6 and 7 in conjunction with FIG. 5. FIGS. 6 and 7 are, respectively cross-sections of the first and second birefringent element taken perpendicular to the optical axis, showing the crystal orientation and the applied voltage for one embodiment. The drivers 58 are electrically connected to the first birefringent element 55 using a first pair of electrodes including a first electrode 61 and a second electrode 62 situated opposite to the first electrode, to thereby apply a first electric field across the first birefringent element 55. Similarly the drivers 58 are electrically connected to apply a second electric field across the second birefringent element 56 by a second pair of electrodes including a third electrode 63 and a fourth electrode 64. Both the first and second electric fields are applied perpendicular to the optical axis 53, although typically not in alignment with each other. In one embodiment the voltages are applied along the c-axis of each of the birefringent elements.

Each of the birefringent elements are aligned with their crystal axes in a particular orientation with respect to the optical axis and a fixed polarization shown at 65. The fixed polarization 65 is determined by the polarizer 57. In one embodiment, one of the crystal axes in each of the birefringent elements is aligned with the optical axis, and the other two crystal axes (each having a differing index) are oppositely aligned with respect to each other (i.e. the optical axes are rotated about 90°). For example FIGS. 6 and 7 show the a-axis of both crystals aligned with the optical axis. The c-axis of the first birefringent element 55 is approximately aligned with the b-axis of the second birefringent element 56; i.e. both are aligned at an approximately equal angle 67 with respect to the fixed polarization. Similarly, the b-axis of the first birefringent element is approximately aligned with the c-axis of the second birefringent element; i.e. both are aligned at an approximately equal angle 68 with respect to the fixed polarization. In one embodiment, the angles 67 and 68 are about 45°, and the angular separation between the c- and b-axes is about 90°.

As described below, in an embodiment where the thickness of the birefringent elements between the electrodes is approximately equal, the voltage applied to the first birefringent element is +V, and the voltage applied to the second birefringent element is −V (i.e. the first and second voltages are approximately equal, but applied in the opposite direction along the c-axis) which has advantages such as described below. For example, in such embodiments a single 500V power supply may be used. In other embodiments, two voltage supplies may be used, one for each birefringent element, and/or the voltages applied may not be equal and opposite, and/or the applied voltage may not be a constant voltage.

Analysis of Dual-BR Filter

The following analysis describes an embodiment in which each of the birefringent elements comprises an LN crystal, thereby providing two LN crystals in series, the first crystal of length $L_1$, the second crystal of length $L_2$. Additionally, the crystal orientations are rotated 90° with respect to one another, thus an o-wave in the first crystal becomes an e-wave in the second crystal, and so forth. Each crystal has an E-field denoted by $E_1$ and $E_2$ respectively. If an input beam polarized at 45° to the LN axes enters the crystal pair, the two orthogonal components of the beam experience the following retardations:

$$\Gamma_1 = \left(\frac{2\pi n_o}{\lambda} - \frac{\pi}{\lambda} n_o^3 r_{13} E_1\right) L_1 + \left(\frac{2\pi n_e}{\lambda} - \frac{\pi}{\lambda} n_e^3 r_{33} E_2\right) L_2 \quad (10a)$$

$$\Gamma_2 = \left(\frac{2\pi n_e}{\lambda} - \frac{\pi}{\lambda} n_e^3 r_{33} E_1\right) L_1 + \left(\frac{2\pi n_o}{\lambda} - \frac{\pi}{\lambda} n_o^3 r_{13} E_2\right) L_2 \quad (10b)$$

If we assume that the E-fields are equal in magnitude, but opposite in sign so that we essentially have a push-pull configuration, the differential retardation becomes $$\Delta\Gamma = -\frac{2\pi}{\lambda} \Delta n \Delta L - \frac{\pi r_{\text{eff}}}{\lambda}(L_1 + L_2) E \quad (11)$$

where $\Delta L = L_1 - L_2$. Up to now we have placed no restrictions whatsoever on the relationship between $L_1$ and $L_2$. Now let us specify the lengths such that the difference in lengths $\Delta L$ yields a zero field birefringence equal to an integer m times $\pi$. Then:

$$\Delta L = \frac{m\lambda}{2\Delta n} \quad (12)$$

is the condition that specifies the minimum loss wavelength and we can again write the difference between the electric field induced birefringence and the static birefringence as:

$$\Delta\Gamma = \Delta\Gamma(E) - \Delta\Gamma_0 = -\frac{\pi r_{\text{eff}} E}{\lambda}(2L_1 + \Delta L) \quad (13)$$

Note that because the minimum loss wavelength depends only the difference in length and not the absolute length of the two birefringent crystals, the temperature sensitivity of the device will be substantially identical to the case of a single birefringent crystal of length $\Delta L$, i.e., the temperature sensitivity of the dual-BR filter will be substantially identical to the BR-FPE filter discussed above.

Again setting the differential field induced phase retardation to $\pi$ and solving for the electric field yields:

$$E_\pi = -\frac{\lambda}{2 r_{\text{eff}} L_1} \frac{1}{1 + \frac{\Delta L}{2 L_1}} \quad (14)$$

Note that if we can neglect the term $\Delta L/L_1$, this expression is identical to that derived previously apart from a factor of 2 in the denominator. Also, the length $L_1$ here is arbitrary, and can be chosen to achieve E-fields in the desired range. For a numerical example, let us assume the same parameters as before. $\Delta L$ is chosen to yield a 25 nm FSR, thus $\Delta L = 0.657$ mm. The effective E-O coefficient is as given previously, and we set $L_1$ to 2 mm. This gives a structure with an overall length of about 4.5 mm. For a 1 mm electrode separation, the resulting voltage required to tune over a full FSR ($E_\pi$) evaluates to 1.9 kV. While still large, this voltage is substantially less than that required by the single crystal BR-FPE filter. In alternative embodiments the required voltage can be brought down (e.g. into the few hundred volt range) by techniques such as adjusting some of the geometrical parameters.

Figure 8:
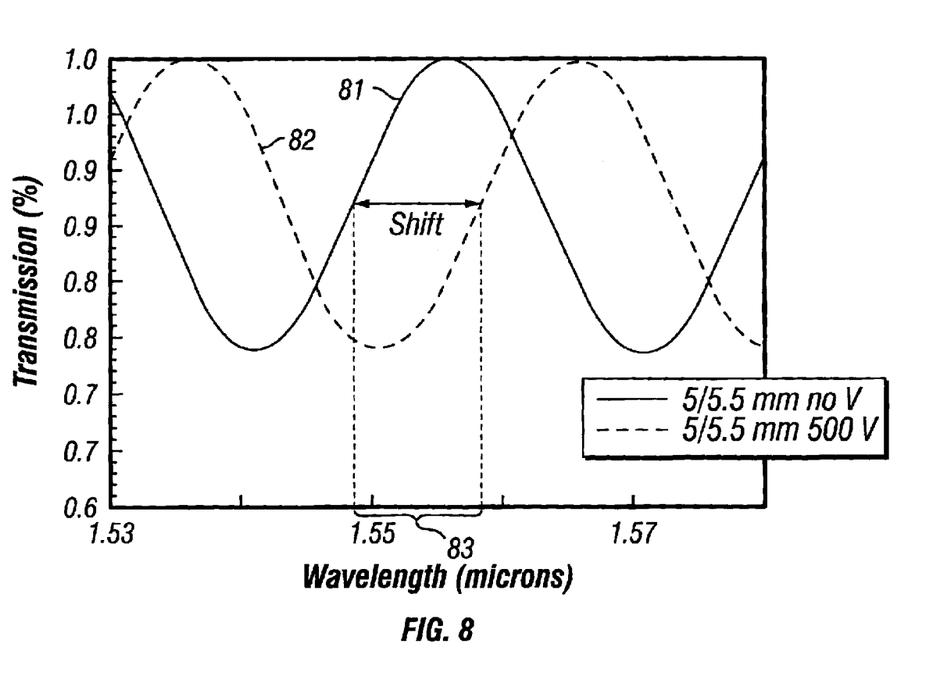
FIG. 8 is a graph that shows the shift in transmission vs. wavelength in one embodiment of the laser that includes a dual-BR filter as in FIG. 5.

FIG. 8 is a graph that shows the calculated shift in transmission vs. wavelength caused by a 500V signal in one embodiment of the laser of FIG. 5, which has a dual-BR filter. In the graphed embodiment, the first birefringent element 55 comprises lithium niobate with a 0.5 mm thickness along the optical axis, and the second birefringent element also comprises lithium niobate but with a 0.55 mm thickness along the optical axis, with their optical axes rotated by about 90°. A solid line 81 shows the calculated transmission for zero applied voltage (0.0V), and a dotted line 82 shows the calculated transmission in response to ±500V applied to the birefringent element and an approximately equal and opposite (−500V) is applied to the second birefringent element. In the example of FIG. 8, the wavelength shift, shown at 83, is about 8 nm for ±500V, which is about 0.02 nm/V. Comparing the graph of FIG. 8 with FIG. 4, it can be seen that the shift in the transmission curve is much larger (e.g., about 10 times) which is because the wavelength shift is determined by the sum of the crystal lengths ($L_1+L_2$) of the two birefringent elements.

External-Cavity Birefringent Filter

Figure 10:
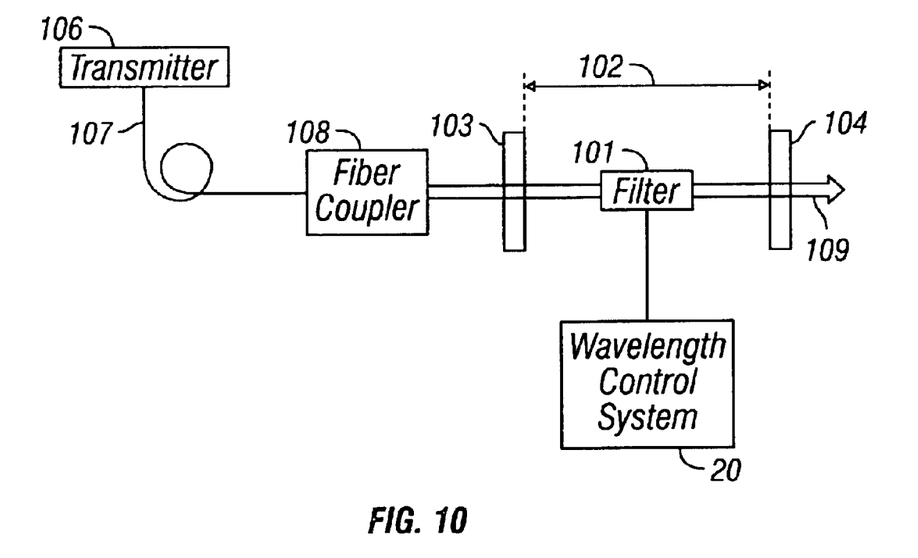
FIG. 10 is a diagram of a single frequency filter for selecting one of a plurality of wavelengths from an externally-supplied optical beam.

For some applications, it may be useful to utilize the birefringent filter by itself, outside of a laser cavity. One such application is telecommunications, for example where a WDM (wavelength division multiplexed) laser signal is transmitted long distances over an optical fiber. At the receiving end, the different wavelengths in the optical beam must be separated by wavelength in order to be useful. FIG. 10 is a diagram showing a configuration in which a single frequency filter 101 such as the BR-FPE or the dual-BR filter described herein, is situated in an external optical cavity 102 defined between a first optical cavity reflector 103 and a second optical cavity reflector 104. The wavelength control system 20 (described with reference to FIG. 1 for example) is coupled to the birefringent filter 101.

A transmitter 106 generates optical signals at a number of different wavelengths, which are combined into a single optical beam that is propagated along a length of optical fiber 107. For communication purposes for example, the length of the optical fiber may be many kilometers. The output of the optical fiber is coupled into the external optical cavity 102 using any suitable fiber coupler 108. The filter 101 will operate to select a single wavelength from the plurality of wavelengths in the signal, and will provide an output beam 109 at a single wavelength.

It will be appreciated by those skilled in the art, in view of these teachings, that alternative embodiments may be implemented without deviating from the spirit or scope of the invention. This invention is to be limited only by the following claims, which include all such embodiments and modifications when viewed in conjunction with the above specification and accompanying drawings.

What is claimed is:

1. A tunable filter for selecting a wavelength from an optical beam that includes a plurality of wavelengths, comprising:
    an optical cavity that defines an optical axis, said optical cavity including a first and a second end mirror;
    a polarizer situated within said optical cavity, said polarizer defining a direction of polarization;
    a first birefringent element situated within said optical cavity, said first birefringent element having an etalon configuration including opposing partially reflective surfaces, said first birefringent element comprising a birefringent material arranged with its dielectric axes offset about 45° from said direction of polarization;
    a second birefringent element situated within said cavity between said first birefringent element and said polarizer, said second birefringent element comprising an optical length along the laser axis that is unequal to the axial optical length of said first birefringent element,
        parallel, smooth opposing surfaces normal to the optical axis, and
        a birefringent material arranged with two of its differing dielectric axes oppositely aligned with the dielectric axes of the first birefringent element; and
    a wavelength control system coupled to said first birefringent element.

2. The filter of claim 1 wherein said polarizer comprises a Brewster plate.

3. The filter of claim 1 wherein said polarization selective element comprises a polarization-selective material.

4. The filter of claim 1 wherein said birefringent element is substantially uncoated.

5. The filter of claim 1 wherein said birefringent element is reflectively coated.

6. The filter of claim 1 wherein said wavelength control system comprises a temperature control system including a thermo-electric cooler thermally coupled to said birefringent element.

7. The filter of claim 1 wherein said birefringent element comprises an electro-optic material, and said wavelength control system comprises an electro-optic driver electrically coupled to said birefringent element.

8. The filter of claim 1 wherein said first and second birefringent elements comprise substantially identical materials.

9. The filter of claim 1 wherein both said first and second birefringent elements are coupled to said wavelength control system.

10. A laser comprising:
    a laser cavity including a first end mirror and a second end mirror that define a laser axis;
    a gain medium situated within said cavity;
    a pump source for pumping the gain medium;
    a polarizer situated within said laser cavity, said polarizer defining a direction of polarization;
    a first and a second birefringent element situated proximately within said laser cavity, wherein
        said first and second birefringent elements have unequal axial lengths,
        each of said first and second birefringent elements has parallel, smooth opposing surfaces normal to the optical axis, and
        said first and second birefringent elements comprise a birefringent material with their dielectric axes oppositely aligned with respect to each other, and their dielectric axes are substantially offset from the direction of polarization; and
    a wavelength control system coupled to said first and said second birefringent elements.

11. The laser of claim 10 wherein said first and second birefringent elements comprise substantially identical materials.

12. The laser of claim 10 wherein said first and second birefringent elements are coupled to a wavelength control system.

13. The laser of claim 10 wherein said birefringent element comprises an electro-optic material, and said wavelength control system comprises an electro-optic driver coupled to said first and second birefringent elements.

14. The laser of claim 10 wherein said wavelength control system comprises a temperature control system including a thermo-electric cooler thermally coupled to said birefringent element.

15. The laser of claim 10 wherein said gain medium comprises a broadband solid state laser material.

16. The laser of claim 10 wherein said solid state laser material comprises Er,Yb:glass.

17. The laser of claim 10 wherein at least one surface of each of said birefringent elements comprises a partially reflective coating.

18. The laser of claim 10 wherein at least one surface of each of said birefringent elements is uncoated.

19. The laser of claim 10 wherein at least one surface of each of said birefringent elements comprises an AR coating.

20. A tunable laser comprising:
a laser cavity including a first end mirror and a second end minor that define a laser axis;
a broadband gain medium situated within said cavity;
a pump source arranged to pump the gain medium;
a polarizer situated within said laser cavity, said polarizer defining a direction of polarization;
a first and a second birefringent element situated proximately within said laser cavity, wherein
said first and second birefringent elements have unequal optical lengths along the laser axis,
each of said birefringent elements define a first, a second, and a third birefringent axis, said first and second birefringent elements arranged with said first axis substantially aligned with said laser axis, said second axis of said first element substantially aligned with said third axis of said second element, and said third axis of said first element substantially aligned with said second axis of said second element, and
said second axis of said first birefringent element is offset by about 45° from said direction of polarization; and
a wavelength control system coupled to said first and second birefringent elements.

21. The laser of claim 20 wherein said first and second birefringent elements comprise substantially identical materials.

22. The laser of claim 20 wherein said first birefringent element is arranged with its second birefringent axis offset about +45° from the direction of polarization, and said second birefringent element is arranged with its third birefringent axis offset about +45° from said direction of polarization so that said second axis of said first birefringent element is approximately aligned with said third axis of said second birefringent element.

23. The laser of claim 20 wherein said wavelength control system comprises a temperature control system including a thermo-electric cooler thermally coupled to said birefringent element.

24. The laser of claim 20 wherein said birefringent element comprises an electro-optic material, and said wavelength control system comprises a pair of electrodes coupled to said birefringent element and an electro-optic driver coupled to said electrodes.

25. The laser of claim 20 wherein said broadband gain medium comprises a solid state laser material.

26. The laser of claim 25 wherein said solid state laser material comprises Er,Yb:glass.

27. The laser of claim 25 wherein said pump source comprises a laser diode and an optical fiber arranged to end pump said solid state laser material.

28. The laser of claim 20 wherein said polarizer comprises a Brewster plate.

29. The laser of claim 20 wherein said polarizer comprises a polarization-selective material.

30. The laser of claim 20 wherein at least one surface of each of said birefringent elements comprises a partially reflective coating.

31. The laser of claim 20 wherein at least one surface of each of said birefringent elements is uncoated.

32. The laser of claim 20 wherein at least one surface of each of said birefringent elements comprises an AR coating.

33. A method of tuning a laser to select a wavelength, comprising:
pumping a gain medium within a laser cavity to generate a laser emission that has a plurality of wavelengths;
controlling an intracavity filter that includes a polarizer that defines a direction of polarization and a first and a second birefringent element with their birefringent dielectric axes at about 45° with respect to said direction of polarization and oppositely aligned with respect to each other, including
applying a first voltage to the first birefringent element, and
applying a second voltage to the second birefringent element to select substantially one of said plurality of wavelengths.

34. The method of claim 33 wherein said first and second birefringent elements comprise a substantially identical material, each of said birefringent elements define a first, a second, and a third dielectric axis, said first and second birefringent elements are arranged with said first axis substantially aligned with said laser axis, said second axis of said first element substantially aligned with said third axis of said second element, and said third axis of said first element substantially aligned with said second axis of said second element, and further comprising applying said first voltage along said third axis of said first element and applying said second voltage along said third axis of said second element.

35. The method of claim 33 wherein said first and second voltages are applied so that said first voltage is approximately opposite from said second voltage, with a common ground.

36. The method of claim 33 further comprising controlling the temperature of the first and second birefringent elements at an approximately equal temperature.

37. The method of claim 33 wherein said step of pumping a gain medium comprises optically pumping a solid state gain medium with a laser diode.

* * * * *